(12) United States Patent
Ishikawa et al.

(10) Patent No.: US 6,191,247 B1
(45) Date of Patent: Feb. 20, 2001

(54) POLYSILOXANE COMPOSITION HAVING SUPERIOR STORAGE STABILITY AND RUBBER COMPOSITION CONTAINING SAME

(75) Inventors: Kazunori Ishikawa; Fumito Yatsuyanagi; Tetsuji Kawazura, all of Hiratsuka (JP)

(73) Assignee: The Yokohama Rubber Co., Ltd., Tokyo (JP)

( * ) Notice: Under 35 U.S.C. 154(b), the term of this patent shall be extended for 0 days.

(21) Appl. No.: 08/831,850

(22) Filed: Apr. 4, 1997

(30) Foreign Application Priority Data

| | | |
|---|---|---|
| Apr. 10, 1996 | (JP) | 8-087950 |
| Aug. 12, 1996 | (JP) | 8-212707 |
| Aug. 29, 1996 | (JP) | 8-228346 |
| Jan. 9, 1997 | (JP) | 9-001938 |

(51) Int. Cl.$^7$ ................................................ C08K 5/36
(52) U.S. Cl. ........................... 528/30; 528/29; 528/31; 528/15; 524/730; 524/750; 524/742; 524/719; 524/723; 524/861; 524/83; 524/262; 524/201; 524/393; 524/392; 524/588; 428/405
(58) Field of Search ................................. 528/30, 29, 31, 528/15; 524/730, 750, 742, 719, 723, 861, 83, 262, 201, 393, 392, 588; 428/405

(56) References Cited

U.S. PATENT DOCUMENTS

| | | | |
|---|---|---|---|
| 4,399,267 | * 8/1983 | Bosch et al. ........................ | 528/30 |
| 4,467,063 | 8/1984 | Lockhart ............................ | 524/106 |
| 4,973,644 | * 11/1990 | Onishi et al. ...................... | 528/15 |
| 5,420,222 | * 5/1995 | Stepp et al. ........................ | 528/31 |
| 5,629,387 | 5/1997 | Frances et al. .................... | 525/478 |

FOREIGN PATENT DOCUMENTS

| | | |
|---|---|---|
| 29 33 247 | 3/1980 | (DE) . |
| 0 246 651 | 11/1987 | (EP) . |
| 0 345 645 | 12/1989 | (EP) . |
| 0 622 420 | 11/1994 | (EP) . |
| 0 661 335 | 7/1995 | (EP) . |
| WO 97/25374 | 7/1997 | (WO) . |

\* cited by examiner

Primary Examiner—Margaret G. Moore
(74) Attorney, Agent, or Firm—Finnegan, Henderson, Farabow, Garrett & Dunner, L.L.P.

(57) ABSTRACT

A polysiloxane composition comprising (A) a polysiloxane having a group represented by the formula (I):

$$\equiv\text{Si}-\text{OR} \qquad \text{(I)}$$

wherein, R is a $C_1$ to $C_{18}$ substituted or unsubstituted monovalent hydrocarbon group or ether bond containing an organic group; and (B) at least 1 ppm of (a) a compound having an N, P, S, Sn, or As component or (b) an acetylene alcohol and a rubber composition containing the same. Specific polysiloxanes (A) contain both formula (I): ≡Si—OR as well as Si—H.

5 Claims, No Drawings

POLYSILOXANE COMPOSITION HAVING SUPERIOR STORAGE STABILITY AND RUBBER COMPOSITION CONTAINING SAME

BACKGROUND OF THE INVENTION

1. Field of the Invention

The present invention relates to a polysiloxane compound having a superior storage stability and more specifically it relates to a polysiloxane compound having an improved storage stability, which is useful as a surface treatment agent for silica or a compounding agent for a rubber composition.

The present invention also relates to a rubber compounding agent capable of improving the vulcanized physical properties of a vulcanizable silica formulated rubber composition, in particular the stress at tensile deformation, the wear resistance, and the tan δ balance and other physical properties and further relates to a rubber composition containing the same.

The present invention further relates to a vulcanizable silica formulated rubber composition having improved reactivity of the silica in the silica formulated rubber composition with the silane coupling agent, alkoxypolysiloxane, etc.

Note that, in the present specification, the "silica" means wet type silica and dry type silica having a nitrogen specific surface area of 50 to 400 m$^2$/g and the "vulcanization" includes cross-linking by, for example, a peroxide, in addition to normal vulcanization with sulfur.

2. Description of the Related Art

Rubber compositions containing various rubbers in which silica has been blended are known. For example, they are used as rubber compositions for tire treads with low heat generation and superior in wear resistance etc. However, while tire treads containing silica have a low rolling resistance and good grip on wet roads, phenomena such as increased viscosity of the unvulcanized formulation, delayed vulcanization, decreased kneading performance of the mixing, etc. arise in the process of manufacture of the tires, and therefore, there has been a problem of a reduction in the productivity. Various studies have been conducted in the past to solve these problems.

From this viewpoint, the present inventors previously proposed a rubber compounding agent comprising a polysiloxane and a silane coupling agent and a rubber composition in which the same was added (Japanese Patent Application No. 8-7663). When this was impregnated in the filler, weighing became easier, but there was the problem that when impregnated there was loss due to adsorption by the carbon etc.

In the past, rubber compositions comprised of various types of rubber containing silica have been used as rubber compositions for tire treads, but have had the defect of an inferior processability when unvulcanized. This is believed to be due to the silanol groups present in the structure. Therefore, the problem of the reduction in the processability has been solved by adding a polysiloxane having an acyloxysilyl group etc. to the rubber composition as a silica surface treatment agent to cause a reaction with the silanol groups and cover the silica surface. However, when synthesizing the above-mentioned polysiloxane, sometimes there are groups which do not become full alkoxylsilyl groups in the structure and remain as Si—H groups.

For example, among the above polysiloxanes, an alkoxy polysiloxane having the structure shown in Formulas (I) and (II) below is synthesized using an alkylhydrogen polysiloxane etc. and an alcohol or alkenyl alkoxysilane using chloroplatinic acid or other transition metal catalyst, but Si—H residual groups sometimes are present in its structure.

In general, a polysiloxane having Si—H groups easily reacts with water or alcohol to generate hydrogen gas in the presence of a platinum or other transition metal catalyst. Further, in a polysiloxane having a plurality of Si—H groups, gelation occurs during heating. Therefore, an alkoxypolysiloxane having Si—H residual groups gradually reacts with water or slightly remaining alcohol even at room temperature to generate hydrogen gas. Further, for example, it gels if stored near the temperature of heating at the time of synthesis of the polysiloxane, that is, 80° C. This phenomenon becomes a problem in the safety and storage stability during storage or transport.

The above problem can be solved if the platinum or other transition metal catalyst is filtered out after the end of the reaction, but the removal of such a metal catalyst requires use of a special filter agent and the productivity is poor.

In silica formulated rubber compositions, various silane coupling agents, such as seen in Japanese Unexamined Patent Publication (Kokai) No. 6-248116, Japanese Examined Patent Publication (Kokoku) No. 6-76526, and Japanese Unexamined Patent Publication (Kokai) No. 8-59894, are used for the purpose of improving the modulus, breakage strength, elongation at break, wear resistance, and other vulcanized physical properties. Further, as disclosed in the specifications of Japanese Patent Application No. 7-223079, Japanese Patent Application No. 7-272859, and Japanese Patent Application No. 7-341540, etc. already filed by the present applicant, an alkoxypolysiloxane for improving the processability is used. However, the reaction between silica and the silane coupling agent or alkoxypolysiloxane is not that good, so a large amount of the silane coupling agent or alkoxypolysiloxane is required for obtaining the desired physical properties and performance.

SUMMARY OF THE INVENTION

The objects of the present invention are to solve the problem in the prior art and to provide a polysiloxane compound having a superior storage stability which solves the problem of the reduction of the storage stability derived from the reaction of the Si—H groups remaining in the polysiloxane structure in the presence of a platinum or other transition metal catalyst.

Another object of the present invention is to provide a rubber compounding agent capable of improving the vulcanized physical properties of a silica formulated vulcanizable rubber composition, in particular the modulus, wear resistance, and tan δ balance, and a silica formulated vulcanizable rubber composition using the same.

Further objects of the present invention are to eliminate the above-mentioned problems in the prior art and to provide a silica formulated rubber composition added with a catalyst for remarkably accelerating the reaction between the silica and said silane coupling agent and/or alkoxypolysiloxane, capable of realizing a reduction in the expensive silane coupling agent and/or alkoxypolysiloxane, and giving high vulcanized physical properties and performance.

In accordance with the present invention, there is provided a polysiloxane composition comprising (A) a polysiloxane having a group represented by the formula (I):

$$\equiv Si-OR \tag{I}$$

wherein R is a $C_1$ to $C_{18}$ substituted or unsubstituted monovalent hydrocarbon group or ether bond containing an organic group and (B) at least 1 ppm of (a) a compound having an N, P, S, Sn, or As component or (b) an acetylene alcohol.

In accordance with the present invention, there is also provided a rubber compounding agent comprising (A) a polysiloxane having an average polymerization degree of 3 to 10,000 and at least one group represented by the above formula (I), wherein R is $OR^1$ or $OCOR^2$, $R^1$ is a $C_1$ to $C_{18}$ substituted or unsubstituted monovalent hydrocarbon group or ether bond containing organic group and $R^2$ is hydrogen or a $C_1$ to $C_{21}$ hydrocarbon group and (B) a wax in a ratio of (A)/(B)=70/30 to 5/95 (weight ratio).

In accordance with the present invention, there is further provided a rubber composition comprising silica and a silane coupling agent and/or a polysiloxane having alkoxysilyl groups, wherein a silanol condensation catalyst in an amount of 0.5 to 200% by weight of the silane coupling agent and/or polysiloxane having alkoxysilyl groups is further contained.

DESCRIPTION OF THE PREFERRED EMBODIMENTS

The present inventor found that the problem of the generation of hydrogen gas and gelation derived from the reaction of the Si—H residual groups of the polysiloxane compound in the present of a platinum or other transition metal catalyst is solved and the storage stability of the polysiloxane compound is improved by the addition to the polysiloxane compound of a compound having an N, P, S, Sn, or As component or acetylene alcohol, whereby the present invention has been completed.

In particular, a polysiloxane composition wherein said S component is a silane coupling agent which contains at least an S atom or a polysiloxane composition wherein said N component is a silane coupling agent which contains at least an N atom is preferred.

The polysiloxane according to the first aspect of the present invention is an alkoxypolysiloxane having in its structure group represented by the above formula (I). In addition to the group (I), a group having the formula (II):

$$\equiv Si-H \qquad (II)$$

is retained in the polysiloxane. The Si—H residual group (II) included in the structure of the alkoxypolysiloxane has the action of being easily dissolved and decomposed by copresent alcohol or water in the presence of a platinum or other transition metal catalyst to produce hydrogen gas. Further, the plurality of Si—H residual groups cause gelation after heating and storage.

The alkoxypolysiloxane having the groups represented by the above formulas (I) and (II) may be any types, but in general an Si—H group containing polysiloxane and alcohol or alkenylalkoxysilane are made to react in the present of platinum chloride or another transition metal catalyst.

As the above Si—H group containing polysiloxane, the following may be mentioned, but particularly preferably methylhydrogen polysiloxane may be mentioned.

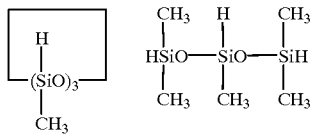

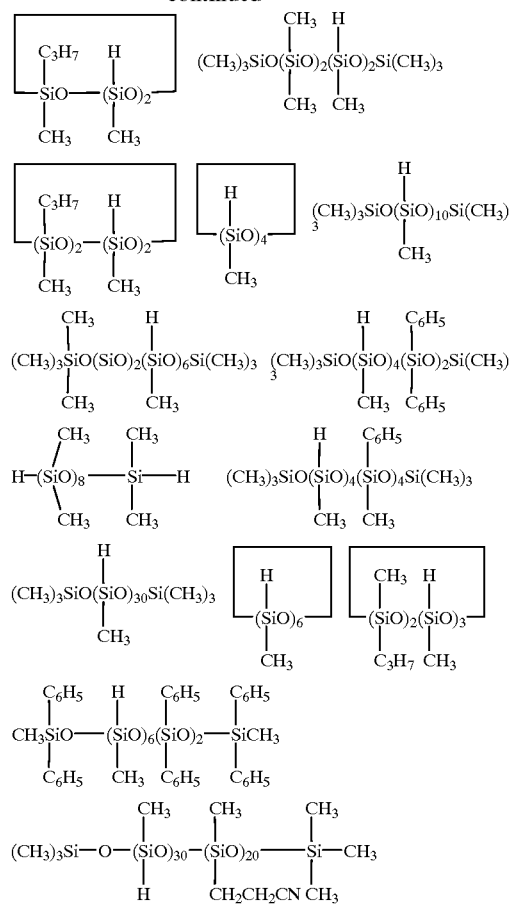

As the above alcohol, methanol, ethanol, propanol, butanol, pentanol, heptanol, octanol, octadecanol, phenol, benzyl alcohol, etc. may be mentioned. Further, ethylene glycol monomethyl ether, diethylene glycol monomethyl ether, and other alcohols containing oxygen atoms may be mentioned. Preferably, ethanol and ethylene glycol monomethyl ether may be mentioned.

As the above alkenylalkoxysilane, the following double bond-containing alkoxysilane may be mentioned, but particularly preferably trimethoxyvinylsilane may be mentioned.

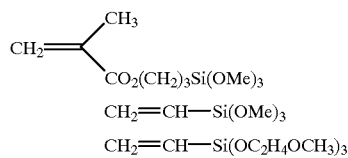

As the above catalyst, in addition to chloroplatinic acid, a platinum-ether complex, a platinum-olefin complex, $PdCl_2(PPh_3)_2$, and $RhCl_2(PPh_3)_2$ may be used.

The polysiloxane used in the present invention may be synthesized by a reaction between a polysiloxane having a reactive functional group at its side chain or end and the silane coupling agent of Table I. As the polysiloxane having the reactive functional group, one having an epoxy group, amine group, mercapto group, carboxyl group, etc. may be mentioned.

TABLE I

| Chemical name | Structure |
|---|---|
| Vinyltrimethoxysilane | $CH_2=CHSi(OCH_3)_3$ |
| Vinyltriethoxysilane | $CH_2=CHSi(OCH_2CH_3)_3$ |
| Vinyltris(2-methoxyethoxy)silane | $CH_2=CHSi(OCH_2CH_2OCH_3)_3$ |
| N-(2-aminoethyl)3-aminopropylmethyldimethoxysilane | $H_2NCH_2CH_2NH(CH_2)_3Si(OCH_3)_2\!\!\mid\!\!CH_3$ |
| N-(2-aminoethyl)3-aminopropyltrimethoxysilane | $H_2NCH_2CH_2NH(CH_2)_3Si(OCH_3)_3$ |
| 3-aminopropyltriethoxysilane | $H_2N(CH_2)_3Si(OCH_3)_3$ |
| 3-glycidoxypropyltrimethoxysilane | 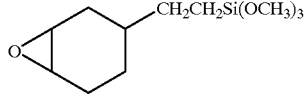 |
| 3-glycidoxypropylmethyldimethoxysilane | |
| 2-(3,4-epoxycyclohexyl)ethyltrimethoxysilane | |
| 3-methacryloxypropyltrimethoxysilane | |
| 3-mercaptopropyltrimethoxysilane | $HS(CH_2)_3Si(OCH_3)_3$ |
| 3-aminopropyltrimethoxysilane | $H_2N(CH_2)_3Si(OCH_2CH_3)_3$ |
| bis-[3-(triethoxysilyl)propyl]tetrasulfide | $[(CH_3CH_2O)_3Si(CH_2)_3]_2S_4$ |

As explained above, in the synthesized polysiloxane, the end group and the side chain are not particularly limited. The end group and side chain are determined by the type of the feedstock at the time of manufacture.

Normally, as a silica surface treatment agent or a processing adjuvant for a silica formulation rubber composition, a polysiloxane having a polymerization degree of 2 to 1000 can be used.

As specific examples, the compounds of the following formulas (1) to (4) may be mentioned.

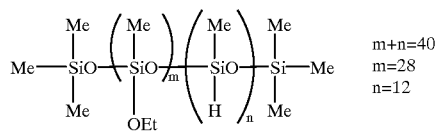

(1) m+n=40, m=28, n=12

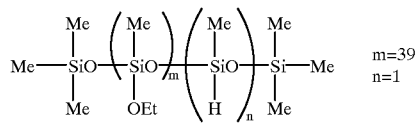

(2) m=39, n=1

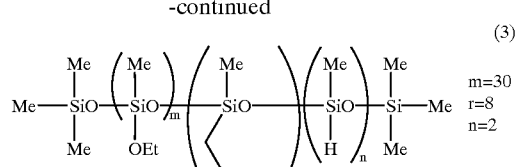

(3) m=30, r=8, n=2

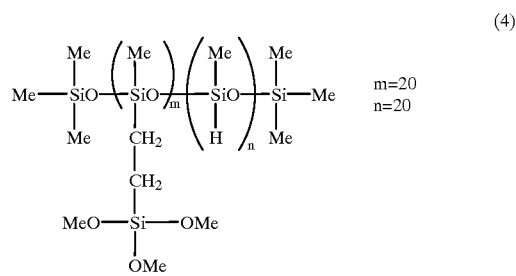

(4) m=20, n=20

In the present invention, as a storage stabilizer, a compound containing an N, P, S, Sn, or As component or an acetylene alcohol is added. These N, P, S, Sn, or As components may be mixtures in the compound, may be present as atoms in the compound, or may be present as groups bonding with other atoms.

The compounds having S components among the storage stabilizers used in the present invention are not particularly limited. A thiol compound, sulfide compound, thiazol compound, thiuram compound, etc. and silane coupling agents comprised of these compounds may be mentioned. Among these, silane coupling agents having a thiol group, sulfide group, thiazole group, and thiocarbamoyl group are particularly preferred. Specifically, the compounds shown in Table II may be mentioned.

TABLE II

| Name of compound | Structure |
|---|---|
| bis-(3-triethoxysilylpropyl)-tetrasulfide | $[(C_2H_5O)_3SiC_3H_6]_2S_4$ |
| 3-trimethoxysilylpropyl-N,N-dimethyl-thiocarbomoyl-tetrasulfide | $(CH_3O)_3SiC_3H_6S_4C(=S)N(CH_3)_2$ |
| Trimethoxysilylpropyl-mercaptobenzothiazole tetrasulfide | $(CH_3O)_3SiC_3H_6S_4$-(benzothiazolyl) |
| Triethoxysilylpropyl-methacrylate-monosulfide | $(C_2H_5O)_3SiC_3H_6SC(CH_3)=CH_2 \; (C=O)$ |
| Dimethoxymethylsilylpropyl-N,N-dimethylthiocarbamoyl-tetrasulfide | $(CH_3O)_2SiC_3H_6S_4C(=S)N(CH_3)_2 \; (CH_3)$ |

TABLE II-continued

| Name of compound | Structure |
| --- | --- |
| γ-mercaptopropyl-trimethoxysilane | $(CH_3O)_3SiC_3H_6SH$ |

Further, as a compound having a P component, triphenyl phosphate, triethyl phosphite, triphenyl phosphine, triphenyl phosphite, etc. may be mentioned.

As a compound having an N component, various amine compounds and tetrabutyl ammonium bromide, melamine resins, urethane resins, etc. may be mentioned. As the amine compounds, specifically triethylamine, dibutylamine, benzylamine, 3-aminopropyltriethoxysilane, etc. may be mentioned.

As a compound having an Sn component, dibutyltin laurate, dibutyltin diacetate, etc. may be mentioned.

As a compound having an As component, arsenic acid, calcium arsenate, iron arsenate, acidic manganese arsenate, sodium arsenite, acidic sodium arsenate, etc. may be mentioned, but Vinyzene (antifungal agent made by Morton Thiokol Co.) etc. is particularly preferred.

As the acetylene alcohol, 3,5-dimethyl-1-hexin-3-ol, 3-methyl-1-buten-3-ol, 3-methyl-1-pentin-3-ol, 2,4,7,9-tetramethyl-5-decin-4,7,-diol, etc. may be mentioned, but 3,5-dimethyl-1-hexin-3-ol is particularly preferred.

In the above polysiloxanes, due to the addition of the compounds having the N, P, S, Sn, or As components or acetylene alcohol, the compounds act on the platinum or other transition metal catalysts and can prevent the gelation during heating and storage derived from the reaction of the Si—H residual groups in the presence of a platinum or other transition metal catalyst or the generation of hydrogen gas in the copresence of alcohol or water in the presence of the above catalysts.

The amount of addition of the storage stabilizer used in the present invention is preferably 1 ppm to 5% by weight, more preferably 5 ppm to 5% by weight.

There is no particular upper limit on the amount of addition in view of the storage stability, but the amount of addition is preferably not more than 5% by weight in view of the odor or the effect of the above storage stabilizer on the physical properties of the rubber.

The polysiloxane compound of the present invention may have blended in it various types of additives such as vulcanization or cross-linking agents, vulcanization or cross-linking accelerators, scorch-preventers, etc. in addition to the above essential components.

According to the second aspect of the present invention, there is provided a rubber compounding agent including (A) a polysiloxane of an average polymerization degree of 3 to 10,000 including at least one of the following alkoxysilyl group (III) and acyloxysilyl group (IV):

≡Si—OR$^1$     (III)

≡Si—OCOR$^2$     (IV)

wherein R$^1$ is a C$_1$ to C$_{18}$ substituted or unsubstituted monovalent hydrocarbon group or ether bond containing organic group and R$^2$ is hydrogen or a C$_1$ to C$_{21}$ hydrocarbon group and (B) wax in a ratio of (A)/(B)=70/30 to 5/95 (weight ratio).

According to the present invention, further, there is provided a rubber composition comprised by, blending into 100 parts by weight of rubber, 5 to 100 parts by weight of silica and an amount of the above rubber compounding agent to give an amount of formulation of polysiloxane included therein of 0.2 to 30% by weight of the total composition.

The silane coupling agent (for example, Si 69) for raising the reinforcing property of the silica and the polysiloxane for improving the processability of the silica (above formulas (III) and (IV)) compete in reaction with the silanol groups on the surface of the silica. Therefore, differences are caused in the physical properties of the rubber according to the method of introduction of the same. For example, when the silica and polysiloxane react too much first, there is a problem of a reduction in the reinforcing property. Therefore, as a countermeasure, the polysiloxane is added as a compounding agent comprised of the polysiloxane impregnated in advance into carbon or another filler so as to prevent the reduction of the physical properties of the rubber. With this method, however, there is the problem of the occurrence of loss by the amount of adsorption. Therefore, the present inventors found that it was possible to obtain a compounding agent by treating a polysiloxane of an average polymerization degree of 3 to 10,000 expressed by formula (III) and/or (IV) by paraffin or other wax, possible to prevent a reduction in the physical properties of the rubber, possible to prevent loss by adsorption due to impregnation in the carbon, and further possible to enhance the dispersion.

According to the second aspect of the present invention, by using a polysiloxane treated with wax, it is possible to delay the reaction of the polysiloxane with the silica when mixed with the rubber, and therefore, possible to improve the physical properties of the rubber, since the hydrophobic portion of the polysiloxane has affinity with the wax. Further, since what is used is a wax, it is superior in dispersion in the rubber and there is substantially no adsorption loss.

As described above, the vulcanized physical properties of tire treads in which silica is blended are excellent, but there is the problem of a reduction of the processability at the time of the unvulcanized state. According to the discovery of the present inventors, this is due to the silanol groups (≡Si—OH) present on the silica surface. The cohesive force of the silanol groups cause the formation of structures in the rubber composition and a rise in the viscosity, while the polarity of the silanol groups causes the adsorption of the vulcanization accelerators etc. and a delay in the vulcanization. Since there is insufficient affinity with nonpolar rubber, the knitting performance in the mixing becomes poorer. Due to these phenomena, the processability of the unvulcanized rubber composition becomes poorer. Further, since a large amount of silane coupling agent is used at the same time in a silica formulation rubber composition to reinforce the rubber, there are silanol groups present even in inner cavities of the silica particles. These react with the silane coupling agent to cause a loss of the silane coupling agent and reduce the reinforcing effect, so there was the problem that it was necessary to blend a large amount of silane coupling agent. If diethylene glycol or another polar substance is added to this as in the prior art, it is possible to prevent to a certain extent the phenomenon of the vulcanization accelerator or other polar compounding agent from being adsorbed, but complete prevention is not possible and it was not possible to prevent the substances chemically bonding with the silane coupling agent or other silica particles from bonding in the inner cavities.

On the other hand, if, in accordance with the present invention, a polysiloxane (A) of a specific molecular weight having an alkoxysilyl group or acyloxysilyl group of the formula (III) or (IV) is blended in the rubber composition, the alkoxysilyl group (I) or acyloxysilyl group (IV) will react with the silanol groups and cover the surface of the silica particles, so the problems in the prior art can be solved and it is possible to effectively suppress a rise in viscosity caused by the cohesive power and polarity of the silanol groups or the wasteful consumption of the vulcanization accelerators and other polar additives and silane coupling agent. However, the inventors discovered that the silane coupling agent for raising the reinforcing ability of the silica and the polysiloxane for improving the processability of the silica compete in reacting with the silanol groups on the silica surface, so differences arise in the physical properties of the rubber due to the method of formulation (or order). That is, if the silica and polysiloxane first react, the reinforcing property declines, which is not preferred. Therefore, in the present invention, the coupling agent and the polysiloxane are mixed in advance and then mixed into the rubber so as to prevent just the polysiloxane from reacting first or the polysiloxane is made to impregnate carbon black or another nonreacting filler (inert powder) or silica or another powder so as to delay the reaction with the silica and thereby prevent the reduction of the vulcanized physical properties of the rubber.

The polysiloxane (A) containing the alkoxysilyl group (III) or acyloxysilyl group (IV) to be blended in the rubber composition according to the present invention, as explained above, must be a polymer (or oligomer) having alkoxysilyl groups (III) or acyloxysilyl groups (IV) reacting with silanol groups and having a magnitude exhibiting a lubricating effect when covering the surface of the silica particles, that is, an average polymerization degree of 3 to 10,000, preferably 10 to 1,000. Accordingly, in the polysiloxane (A) used in the present invention, the presence of $\equiv$Si—O—$R^1$ groups or $\equiv$Si—$OCOR^2$ groups is essential. These groups may be at the main chain, side chains, or ends. Further, there are preferably at least six $OR^1$ and $OCOR^2$ groups directly bonding with Si atoms in the molecule for strengthening the bond with the silica. Further, there may be hydrogen groups and other organic groups. The polysiloxane is a known substance and may for example be manufactured in general as follows:

The above polysiloxane (A) containing the alkoxysilyl groups or acyloxysilyl groups may be synthesized by causing a reaction between an Si—H group containing polysiloxane and an alcohol or carboxylic acid in the presence of a catalyst.

As the above Si—H group containing polysiloxane, those mentioned above can be used.

As the above alcohol, methanol, ethanol, propanol, butanol, pentanol, heptanol, octanol, octadecanol, phenol, benzyl alcohol, and other ethylene glycol monomethyl ether, diethylene glycol monomethyl ether, and other alcohols containing oxygen atoms may be mentioned. Further, as the carboxylic acid, acetic acid, propionic acid, palmitic acid, stearic acid, myristic acid, etc. may be mentioned.

Further, as the above catalyst, chloroplatinic acid, a platinum-ether complex, a platinum-olefin complex, $PdCl_2(PPh_3)_2$, and $RhCl_2(PPh_3)_2$ may be used. Synthesis is possible by causing a reaction between the corresponding $\equiv$Si—H group containing polysiloxane and alcohol or carboxylic acid in the presence of the catalyst. As the method of introducing the organic groups, the groups may be easily introduced by causing a reaction between $\equiv$Si—H and an organic compound having a double bond using the above catalyst. As compounds having a double bond, there are styrene, α-methylstyrene, limonene, vinyl cyclohexene, etc.

As another method, synthesis is possible by causing a reaction of a corresponding $\equiv$Si—H group containing polysiloxane and an alkoxysilane containing a double bond as shown above in the presence of the above catalyst.

The polysiloxane (A) used in the present invention may further be synthesized by a reaction between a polysiloxane having a reactive functional group at its side chain or end and the silane coupling agent of Table I above. As a polysiloxane having the reactive functional group, one having an epoxy group, amine group, mercapto group, carboxyl group, etc. may be mentioned.

Note that, in the present invention, the polysiloxane (A) is not particularly limited in its end group and side chain as explained above. These may be determined by the type of the starting materials at the time of manufacture.

The polysiloxane (A) used in the present invention is blended to 0.2 to 30% by weight of silica in the rubber composition, particularly preferably 1.0 to 10% by weight. If the amount of the polysiloxane (A) blended is too small, the desired effect cannot be obtained, while conversely if too large, substances not bonding with the silica will sometimes ooze out of the vulcanized product.

The rubber blended as the main component in the vulcanizable rubber composition according to the present invention may be any rubber generally blended in various rubber compositions in the past, for example, natural rubber (NR), polyisoprene rubber (IR), various types of styrene-butadiene copolymer rubbers (SBR), various types of polybutadiene rubbers (BR), acrylonitrile-butadiene copolymer rubbers (NBR), butyl rubbers (IIR), and other diene type rubbers and ethylene-propylene copolymer rubbers (EPR, EPDM), and the like alone or in any blends thereof.

The wax (B) used in the vulcanizable rubber composition of the present invention may be any wax used in the past for a rubber formulation.

As an example of such a wax, paraffin and microcrystalline type petroleum waxes, beeswax and other natural waxes, ozokerite wax, etc. may be mentioned. The wax may extend over the range of animal, mineral, plant, and synthetic waxes. Various methods may be used for the mixing of the polysiloxane and wax before introduction into the rubber. A simple method for mixture is to heat the wax until melting, then use stirring to mix in the polysiloxane and cause sufficient dispersion. Another method is to deposit the polysiloxane on the wax melted in a container, then vigorously stir the wax in the container to achieve sufficient dispersion of the polysiloxane in the wax. The two may be further mixed by a double-roll machine, internal mixer (Bambury, kneader), and generally usable ordinary mixers. The mixture of the wax and polysiloxane obtained in this way may be added to the rubber formulation in accordance with ordinary methods.

If the wax (B) is blended in the vulcanizable composition according to the present invention, it is possible to reduce the amount of use of the silane coupling agent (B) compared with the past and possible to further improve the wear resistance. The preferable amount of the wax (B) used in the present invention is 70/30 to 5/95, preferably 60/40 to 20/80, in terms of the ratio (A)/(B) (weight ratio) of the polysiloxane (A) and the wax (B) in the composition. If the amount of the wax (B) blended is too small, the desired effects will not be obtained, while conversely if too large, the physical properties will end up deteriorating and the effect of the addition of the polysiloxane will end up becoming lessened.

The silica formulation rubber composition according to the present invention is comprised by, blending into 100 parts by weight of rubber, 5 to 100 parts by weight, preferably 5 to 80 parts by weight, of silica and an amount of the rubber compounding agent (that is, premix of polysiloxane (A) and wax (B)) to give an amount of blending of polysiloxane (A) in the entire composition of 0.2 to 30% by weight, preferably 1 to 10% by weight, of the total composition. Further, two or more types of these rubber compounding agents may be used together.

The rubber composition according to the present invention may contain, in addition to the above-mentioned essential components, carbon black, a vulcanization or cross-linking agent, a vulcanization or cross-linking accelerator, various types of oils, antioxidants, fillers, plasticizers, and other various types of additives generally blended in for tires or other general rubber applications. The formulation may be kneaded and vulcanized to make the composition by general methods and used for vulcanization or cross-linking. The amounts of these additives blended may be the general amounts blended in the past so long as the object of the present invention is not contravened.

According to the third aspect of the present invention, there is provided a rubber composition in which are blended silica and a silane coupling agent and/or a polysiloxane having alkoxysilyl groups. This rubber composition is characterized by adding a silanol condensation catalyst in an amount of 0.5 to 200% by weight of the silane coupling agent and/or polysiloxane having alkoxysilyl groups.

Further, according to a preferred embodiment of the third aspect of the present invention, there is provided a rubber composition wherein said silanol catalyst is a titanium-based catalyst.

The vulcanized physical properties of a rubber composition in which silica is blended are excellent, but there is the defect of an inferior processability at the time when unvulcanized. It became clear that this was due to the silanol groups ($\equiv$Si—OH) present on the silica surface. The cohesive force of the silanol groups cause the formation of structures in the rubber composition and the increase in the viscosity, while the polarity of the silanol groups causes the adsorption of the vulcanization accelerators etc. and the delay in the vulcanization. Since there is insufficient affinity with nonpolar rubber, the knitting performance in the mixing becomes poorer. Due to these phenomena, the processability of the unvulcanized rubber composition becomes poorer. Therefore, in a previous invention of the present inventors, the above problem was solved by blending in a polysiloxane having alkoxysilyl groups into the silica formulation rubber composition and causing a reaction between the alkoxypolysiloxane and the silanol groups on the surface of the silica particles to thereby cover the surface. However, the reaction of the alkoxypolysiloxane and silanol groups on the surface of the silica particles was slow and therefore there was still the problem of the need for a relatively large amount of alkoxypolysiloxane. Further, in the past, a large amount of silane coupling agent was used to reinforce the rubber, but there are silanol groups present even in inner cavities of the silica particles. These react with the silane coupling agent to cause a loss of the silane coupling agent and reduce the reinforcing effect, and therefore, there was the problem that it was necessary to blend in a large amount of silane coupling agent.

According to the present invention, since a silanol condensation catalyst is blended into the rubber composition in which silica and a silane coupling agent and/or a polysiloxane containing alkoxysilyl groups are blended, the silanol condensation catalyst accelerates the reaction of the silanol groups on the surface of the silica particles and the silane coupling agent and alkoxypolysiloxane and causes the silane coupling agent or alkoxypolysiloxane to quickly cover the surface of the silica particles, and therefore, the efficiency of consumption of the silane coupling agent or alkoxypolysiloxane is raised by that amount and it is possible to enhance the desired action and effect.

The silanol condensation catalyst blended into the rubber formulation according to the present invention is selected and used from titanium family organic metal catalysts such as tetraisopropyl titanate and titanium acetyl acetate, tin family organic metal catalysts such as dibutyl tin dilaurate, zinc family organic metal catalysts such as zinc octylate, amine family organic catalysts such as dimethylstearyl amine, etc. Among these, the above titanium family organic metal catalysts are preferable in terms of achieving the desired effects of the invention of this application.

The amount of the silanol condensation catalyst used in the present invention is 0.5 to 200% by weight, preferably 5 to 100% by weight, more preferably 5 to 50% by weight, with respect to the amount of blending of the silane coupling agent and/or polysiloxane having the alkoxysilyl groups.

As the silane coupling agent blended in the rubber composition in the present invention, it is possible to use any silane coupling agent which has been used together with a silica filler in the past. The typical examples are shown below. Of these, 13) bis-[3-(triethoxysilyl)-propyl] tetrasulfide is most preferred in terms of the processability and vulcanized physical properties. Further, the special silane coupling agents of 14) to 17) may also be suitably used.

| Chemical name | Structure |
|---|---|
| 1) Vinyltrimethoxysilane | $CH_2=CHSi(OCH_3)_3$ |
| 2) Vinyltriethoxysilane | $CH_2=CHSi(OCH_2CH_3)_3$ |
| 3) Vinyltris(2-methoxyethoxy)silane | $CH_2=CHSi(OCH_2CH_2OCH_3)_3$ |
| 4) N-(2-aminoethyl)3-aminopropylmethyldimethoxysilane | $H_2NCH_2CH_2NH(CH_2)_3Si(OCH_3)_2$<br>$\|$<br>$CH_3$ |
| 5) N-(2-aminoethyl)3-aminopropyltrimethoxysilane | $H_2NCH_2CH_2NH(CH_2)_3Si(OCH_3)_3$ |
| 6) 3-aminopropyltriethoxysilane | $H_2N(CH_2)_3Si(OCH_3)_3$ |
| 7) 3-glycidoxypropyltrimethoxysilane | $CH_2\text{—}CHCH_2O(CH_2)_3Si(OCH_3)_3$<br>$\underset{O}{\diagdown\diagup}$ |

| Chemical name | Structure |
| --- | --- |
| 8) 3-glycidoxypropylmethyldimethoxysilane | $\underset{O}{CH_2-CHCH_2O(CH_2)_3Si(OCH_3)_2}$ <br> $\quad\quad\quad\quad\quad\quad\quad\quad\quad\quad\quad CH_3$ |
| 9) 2-(3,4-epoxycyclohexyl)ethyltrimethoxysilane | (epoxycyclohexyl)-CH$_2$CH$_2$Si(OCH$_3$)$_3$ |
| 10) 3-methacryloxypropyltrimethoxysilane | $CH_2\!=\!CCO_2(CH_2)_3Si(OCH_3)_3$ <br> $\quad\quad\; CH_3$ |
| 11) 3-mercaptopropyltrimethoxysilane | $HS(CH_2)_3Si(OCH_3)_3$ |
| 12) 3-aminopropyltrimethoxysilane | $H_2N(CH_2)_3Si(OCH_2CH_3)_3$ |
| 13) bis-[3-(triethoxysilyl)-propyl]tetrasulfide | $[(CH_3CH_2O)_3Si(CH_2)_3]_2S_4$ |
| 14) 3-trimethoxysilylpropyl-N,N-dimethylthiocarbamoyl-tetrasulfide | $(CH_3O)_3SiC_3H_6S_4C\underset{\underset{S}{\parallel}}{N}\!\!\begin{array}{l}CH_3\\CH_3\end{array}$ |
| 15) Trimethoxysilylpropyl-mercaptobenzothiazole tetrasulfide | $(CH_3O)_3SiC_3H_6S_4$—benzothiazole |
| 16) Triethoxysilylpropyl-methacrylate-monosulfide | $(C_2H_5O)_3SiC_3H_6SC\underset{\underset{O}{\parallel}}{\overset{CH_3}{C}}\!\!-CH_3$ |
| 17) Dimethoxylmethylsilylpropyl-N,N-dimethylthiocarbamoyl-tetrasulfide | $(CH_3O)_2SiC_3H_6S_4C\underset{\underset{S}{\parallel}}{N}\!\!\begin{array}{l}CH_3\\CH_3\end{array}$ <br> $\quad\quad\; CH_3$ |

If a silane coupling agent is blended in the rubber composition according to the present invention, it is possible to further reduce the amount of use of the silane coupling agent compared with the past, whereby it is possible to improve the wear resistance of the rubber composition. The preferable amount of use of the silane coupling agent in the present invention is 1 to 40% by weight, more preferably 2.5 to 20% by weight, based upon the amount of blending of the silica in the rubber composition. If the amount of blending of the silane coupling agent is too small, the desired effects cannot be obtained, while conversely if too great, not only is there waste, but also scorching easily occurs in the mixing or extrusion steps.

As the polysiloxane having the alkoxysilyl groups to be blended in the rubber composition in the present invention, an alkoxypolysiloxane containing the following alkoxysilyl groups (III) and having an average polymerization degree of 3 to 10,000, preferably 10 to 1,000 may be used:

$$\equiv Si\!-\!OR^1 \quad\quad (III)$$

wherein, $R^1$ is a $C_1$–$C_{18}$ substituted or unsubstituted monovalent hydrocarbon group or ether bond containing organic group.

The alkoxysilyl group (III) may be bonded at any position of the end, side chains, or main chain of the polysiloxane. Further, bonding at the position of the main chain is preferable in terms of scorching.

The above alkoxypolysiloxane is a known substance and, for example, is generally synthesized by causing a reaction between the following polyalkylhydrogen siloxane and an alcohol or carboxylic acid in the presence of a catalyst.

As the above alcohol, methanol, ethanol, propanol, butanol, pentanol, heptanol, octanol, octadecanol, phenol, benzyl alcohol, and also ethylene glycol monomethyl ether, diethylene glycol monomethyl ether, and other alcohols containing oxygen atoms may be mentioned. Further, as the carboxylic acid, acetic acid, propionic acid, palmitic acid, stearic acid, myristic acid, etc. may be mentioned. As the above catalyst, chloroplatinic acid, a platinum-ether complex, a platinum-olefin complex, $PdCl_2(PPh_3)_2$, and $RhCl_2(PPh_3)_2$, etc. may be used.

The amount of blending of the polysiloxane having the alkoxysilyl groups used in the present invention is 1 to 40% by weight, preferably 2.5 to 20% by weight, with respect to the weight of the silica in the rubber composition. If the amount of blending of the polysiloxane having the alkoxysilyl groups is too small, the desired effect cannot be obtained even in the presence of the silanol condensation catalyst of the present invention, while conversely if too large, substances not bonding with the silica will sometimes ooze out of the vulcanized product causing a reduction of the vulcanized physical properties and waste.

The rubber blended as the main component in the vulcanizable rubber composition according to the present invention may be any rubber generally blended in various rubber compositions in the past, for example, natural rubber (NR), polyisoprene rubber (IR), various types of styrene-butadiene copolymer rubbers (SBR), various types of polybutadiene rubbers (BR), acrylonitrile-butadiene copolymer rubbers (NBR), butyl rubbers (IIR), and other diene type rubbers and ethylene-propylene copolymer rubbers (EPR, EPDM), and the like alone or in any blends thereof.

EXAMPLES

The present invention will now be further illustrated by, but is by no means limited to, the following Examples and Comparative Examples.

Example 1

(1) Synthesis of Polysiloxane—Synthesis Examples I-1 to I-4

Synthesis Example I-1: Synthesis of Polysiloxane 1

To 50.5 g of ethanol was added 100 µl of a 1% isopropyl alcohol solution of chloroplatinic acid and heated to 70° C. To this was then dropwise added 100 g of methylhydrogen polysiloxane (made by Wacker Chemical Co.) over 2 hours. After 1 hour from the end of the dropwise addition, the reaction temperature was raised to 90° C. and the reaction continued for further 4 hours.

$^1$HNMR confirmed that 70% of all of the Si—H groups were converted to Si—OEt groups.

Note that the polysiloxane 1 is a compound of the following formula (1):

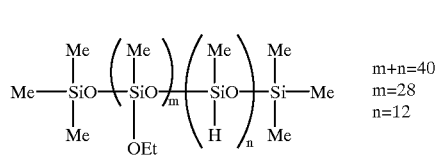

(1)
m+n=40
m=28
n=12

Synthesis Example I-2: Synthesis of Polysiloxane 2

This was synthesized in the same way as Synthesis Example I-1 except for the use of 70.5 g of ethanol.

$^1$HNMR confirmed that 97% of all of the Si—H groups were converted to Si—OEt groups.

Note that the polysiloxane 2 is a compound of the following formula (2):

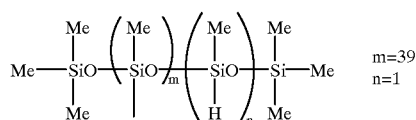

(2)
m=39
n=1

Synthesis Example I-3: Synthesis of Polysiloxane 3

To 100 g of methyl hydrogen polysiloxane and 74 g of α-methylstyrene dimer were added 50 µl of a 2.5% isopropyl alcohol solution of chloroplatinic acid and was heated to 90° C. and reacted for 2 hours. The resultant mixture was dropwise added at 70° C. into 54 g of ethanol over 2 hours. One hour after addition, the reaction temperature was raised to 90° C. and the reaction continued for further 4 hours.

Note that the polysiloxane 3 is a compound of the following formula (3):

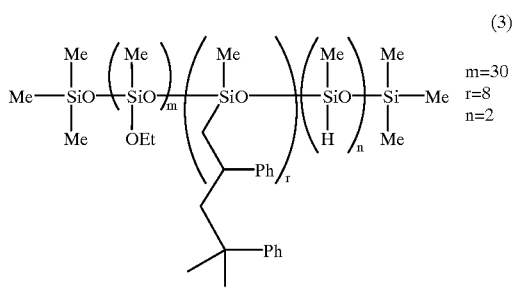

(3)
m=30
r=8
n=2

Synthesis Example I-4: Synthesis of Polysiloxane 4

To 100 g of methyl hydrogen polysiloxane and 116 g of trimethoxyvinylsilane were added 20 µl of a 2.5% isopropyl alcohol solution of chloroplatinic acid. This was heated to 85° C. and reacted for 2 hours.

Note that the polysiloxane 4 is a compound of the following formula (4):

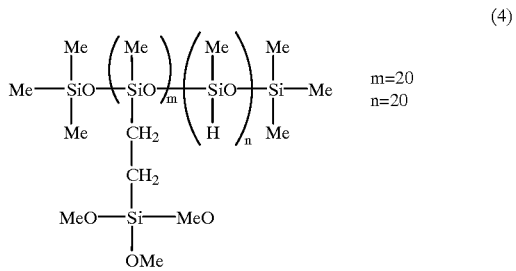

(4)
m=20
n=20

(2) Synthesis of Polysiloxanes With Added Storage Stabilizers—Examples I-1 to I-8

As storage stabilizers, the following silane coupling agents, DBDL, and acetyl alcohol were added. As the silane coupling agents, the following three agents were used:

[1] Silane Coupling Agent 1
  bis-(3-triethoxysilylpropyl)-tetrasulfide [$(C_2H_5O)_3Si(CH_2)_3]_2S_4$
[2] Silane Coupling Agent 2
  γ-mercaptopropyl-trimethoxysilane $(CH_3O)_3Si(CH_2)_3SH$
[3] Silane Coupling Agent 3
  3-trimethoxysilylpropyl-N,N-dimethylthiocarbamoyl-tetrasulfide

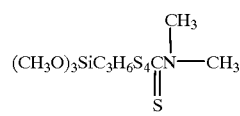

Example I-1

During the synthesis of the polysiloxane 1, 10 ppm of the silane coupling agent 2 was added with respect to 100 g of the polysiloxane 1 to obtain the polysiloxane compound.

Example I-2

During the synthesis of the polysiloxane 2, 10 ppm of the silane coupling agent 1 was added with respect to 100 g of the polysiloxane 2 to obtain the polysiloxane compound.

Example I-3

During the synthesis of the polysiloxane 3, 10 ppm of the silane coupling agent 1 was added with respect to 100 g of the polysiloxane 3 to obtain the polysiloxane compound.

Example I-4

During the synthesis of the polysilbxane 4, 10 ppm of the silane coupling agent 2 was added with respect to 100 g of the polysiloxane 4 to obtain the polysiloxane compound.

Example I-5

During the synthesis of the polysiloxane 1, 10 ppm of the silane coupling agent 2 was added with respect to 100 g of the polysiloxane 1 to obtain the polysiloxane compound.

Example I-6

During the synthesis of the polysiloxane 1, 10 ppm of DBDL was added with respect to 100 g of the polysiloxane 1 to obtain the polysiloxane compound.

Example I-7

During the synthesis of the polysiloxane 1, 10 ppm of acetylene alcohol was added with respect to 100 g of the polysiloxane 1 to obtain the polysiloxane compound.

Generation of Hydrogen

Whether hydrogen gas was generated from the polysiloxane compound at room temperature was measured using a gas burette. In the table, "No" means that the amount of hydrogen gas generated per 100 g of the polysiloxane compound was less than 1.0 ml and "Yes" means that it was more than 1.0 ml.

Storage Stability

The polysiloxane compounds were held for 7 days at 80° C. and the states of the polysiloxane compounds were observed.

The results are shown in Table III.

TABLE III

| | Examples | | | | | | | | Comp. Ex. | | |
|---|---|---|---|---|---|---|---|---|---|---|---|
| | I-1 | I-2 | I-3 | I-4 | I-5 | I-6 | I-7 | I-8 | I-1 | I-2 | I-3 |
| Siloxane 1 | 100 | — | — | — | 100 | 100 | 100 | 100 | 100 | — | — |
| Siloxane 2 | — | 100 | — | — | — | — | — | — | — | 100 | — |
| Siloxane 3 | — | — | 100 | — | — | — | — | — | — | — | — |
| Siloxane 4 | — | — | — | 100 | — | — | — | — | — | — | 100 |
| Silane coupling agent 1 (ppm) | — | 10 | 10 | — | — | — | — | — | — | — | — |
| Silane coupling agent 2 (ppm) | 10 | — | — | 10 | 1 | — | — | — | — | — | — |
| Silane coupling agent 3 (ppm) | — | — | — | — | — | — | — | 10 | — | — | — |
| DBDL[1] (ppm) | — | — | — | — | — | 10 | — | — | — | — | — |
| Acetylene alcohol[2] (ppm) | — | — | — | — | — | — | 10 | — | — | — | — |
| Generation of hydrogen (room temperature) | No | No | No | No | No | No | No | No | No | Yes | No |
| Storage stability (80° C., 7H) | NC | NC | NC | NC | NC | NC | NC | NC | Gel | NC | Gel |

[1])Dibutyltin laurate
[2])3,5-dimethyl-1-hexin-3-ol
[3])NC = No change

Example I-8

During the synthesis of the polysiloxane 1, 10 ppm of the silane coupling agent 3 was added with respect to 100 g of the polysiloxane 1 to obtain the polysiloxane compound.

As Comparative Examples, the following polysiloxanes were used.

Comparative Example I-1

100 g of the polysiloxane 1 was used.

Comparative Example I-2

100 g of the polysiloxane 2 was used.

Comparative Example I-3

100 g of the polysiloxane 4 was used.

The polysiloxane compounds synthesized in the above Examples I-1 to I-8 and Comparative Examples I-1 to I-3 were evaluated as to the following physical properties:

Effect of the Invention

As shown in the above Examples and Comparative Examples, the problem of the gelation of the polysiloxane and the generation of hydrogen gas derived from the reaction of the Si—H residual groups present in the polysiloxane structure is solved and it is possible to obtain a polysiloxane compound having an extremely high storage stability which is free from the fear of gelation during storage and does not generate hydrogen gas.

Example II

The following commercially available products were used for the other ingredientes used for the formulation of the examples and comparative examples:

Natural rubber: RSS#1
SBR (NS116): Nipol NS116 (made by Nippon Zeon)
SBR (NP9528): Nipol 9528 (made by Nippon Zeon)
SBR (NP1730): Nipol 1730 (made by Nippon Zeon)

BR (NP1220): Nipol 1220 (made by Nippon Zeon)

Silica: Nipsil AQ (Nippon Silica)

Silane coupling agent: Si 69 (Degussa) (chemical name: bis-[3-(triethoxysilyl)-propyl]tetrasulfide)

Polysiloxane: Polymethylethoxysiloxane

Carbon black 1: Seast KH (Tokai Carbon)

Carbon black 2: Seast 9M (Tokai Carbon)

Wax 1: Nihon Seiro OZOACE-0037, melting point 61° C.

Wax 2: Nihon Seiro OZOACE-0015, melting point 69° C.

Production of Processing Agent
Polymethylethoxysiloxane 100 g of polymethylhydrogen siloxane (KF 99, Shin-etsu Chemical Co., Ltd.) was dropwise added to 75 g of ethanol and 100 μl of a 1% isopropyl solution of chloroplatinic acid at 70° C. over 1 hour. After the addition was finished, a reaction was caused at 80° C. for 8 hours to produce a polymethylethoxysiloxane of the following structural formula. The reaction rate was 90%.

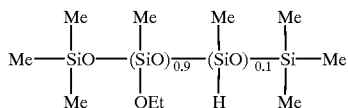

Powder sulfur: 5% oil-treated powder sulfur

Antioxidant 6C: N-phenyl-N'-(1,3-dimethylbutyl)-p-phenylene diamine

Vulcanization accelerator CZ: N-cyclohexyl-2-benzothiazylsulfenamide

Vulcanization accelerator DPG: Diphenylguanidine

Zinc oxide: Zinc White No. 3

Stearic acid: Industrial use stearic acid

Method of Mixing Wax and Polysiloxane

A suitable beaker was used and wax and a polysiloxane mixed therein in a 1:1 ratio. The mixture was heated to about 80° C. to melt the wax, then was stirred. After the stirring, it was naturally cooled to solidify the wax component, then the mixture was transferred to a mortar and ground by a pestle to obtain the desired compounding agent.

Preparation of Sample

Of the ingredients shown in Tables IV, V, and VI, first the ingredients for formulation in step 1 were kneaded in a 1.8 liter internal mixer for 3 to 5 minutes. When reaching 165±5° C., the master batch was discharged. The ingredients of the second step were blended in, then a vulcanization accelerator and sulfur were kneaded by an 8-inch open roll to obtain the rubber composition. The rubber composition thus obtained was press-vulcanized in a 15×15×0.2 cm mold at 160° C. for 20 minutes to prepare the desired test piece (rubber sheet) which was then evaluated for its vulcanized physical properties.

The test methods for the vulcanized physical properties of the compositions obtained the following examples were as follows:

Vulcanized Physical Properties 1) 300% deformation stress, breaking strength, elongation at break: Measured based on JIS K6251 (dumbbell shape No. 3)

2) tan δ (0° C. and 60° C.): Measured by viscoelasticity device Rheograph Solid made by Toyo Seiki Seisakusho at 20 Hz, initial elongation of 10%, and dynamic strain of 2% (sample width 5 mm, temperature 0/60° C.)

3) Wear resistance: Measured by Lambourn tester with reduction of weight due to wear expressed as index
Wear resistance (index)=[(Reduction of weight of Standard Example II-9)/Reduction of weight of sample)]×100

Examples II-1 and II-2 (Comparative Examples) and Example II-3 (Example of Invention)

These Examples show the results of evaluation of a polysiloxane/wax mixture in an NR/SBR system. The formulations and results of evaluation were as shown in Table IV.

TABLE IV

|  | Ex. II-1[*1] | Ex. II-2[*1] | Ex. II-3[*2] |
|---|---|---|---|
| (Step 1) | | | |
| NR. (RSS#1) | 50.0 | 50.0 | 50.0 |
| SBR (NP116) | 50.0 | 50.0 | 50.0 |
| Silica | 50.0 | 50.0 | 50.0 |
| Diethylene glycol | 2.5 | 2.5 | 2.5 |
| Silane coupling agent | 2.5 | 2.5 | 2.5 |
| Polysiloxane | 2.5 | — | — |
| Polysiloxane/carbon black 1 (=1/1) mixture | — | 5.0 | — |
| Wax 1/polysiloxane (=1/1) mixture | — | — | 5.0 |
| Wax 1 | 2.5 | 2.5 | — |
| Carbon black 1 | 2.5 | — | 2.5 |
| Zinc oxide | 3.0 | 3.0 | 3.0 |
| Stearic acid | 1.0 | 1.0 | 1.0 |
| Antioxidant 6C | 1.0 | 1.0 | 1.0 |
| (Step 2) | | | |
| Powder sulfur | 1.5 | 1.5 | 1.5 |
| Vulcanization accelerator DPG | 1.0 | 1.0 | 1.0 |
| Vulcanization accelerator CZ | 0.3 | 0.3 | 0.3 |
| -Vulcanized physical properties- | | | |
| 300% deformation stress (MPa) | 10.0 | 10.3 | 10.7 |
| Breaking strength (MPa) | 22.7 | 23.0 | 23.4 |
| Elongation at break (%) | 513 | 537 | 538 |
| tan δ (0° C.) | 0.56 | 0.55 | 0.55 |
| tan δ (60° C.) | 0.15 | 0.14 | 0.13 |
| tan δ gradient (0°/60° C.) | 3.73 | 3.93 | 4.23 |
| Wear resistance (index) | 100 | 104 | 106 |

(Note: [*1]indicates Comparative Example and [*2]Example of Invention)

Examples II-4 and II-5 (Comparative Examples) and Example II-6 (Example of Invention)

These Examples show the results of evaluation of a polysiloxane/wax mixture in an NR and BR system. The formulations and results of evaluation were as shown in Table V.

TABLE V

|  | Ex. II-4[*1] | Ex. II-5[*1] | Ex. II-6[*2] |
|---|---|---|---|
| (Step 1) | | | |
| NR (RSS#1) | 60.0 | 60.0 | 60.0 |
| BR (NP1220) | 40.0 | 40.0 | 40.0 |
| Silica | 20.0 | 20.0 | 20.0 |
| Diethylene glycol | 1.5 | 1.5 | 1.5 |

TABLE V-continued

|  | Ex. II-4[*1] | Ex. II-5[*1] | Ex. II-6[*2] |
|---|---|---|---|
| Silane coupling agent | 1.0 | 1.0 | 1.0 |
| Polysiloxane | 1.0 | — | — |
| Wax 1/polysiloxane (=1/1) mixture | — | — | 2.0 |
| Carbon black 1/polysiloxane (=1/1) mixture | — | 2.0 | — |
| Wax 1 | 1.0 | 1.0 | — |
| Carbon black 1 | 1.0 | — | 1.0 |
| Carbon black 2 | 40.0 | 40.0 | 40.0 |
| Zinc oxide | 5.0 | 5.0 | 5.0 |
| Stearic acid | 1.0 | 1.0 | 1.0 |
| Antioxidant 6C | 5.0 | 5.0 | 5.0 |
| Aroma oil | 20.0 | 20.0 | 20.0 |
| (Step 2) | | | |
| Powder sulfur | 1.0 | 1.0 | 1.0 |
| Vulcanization accelerator CZ | 1.0 | 1.0 | 1.0 |
| -Vulcanized physical properties- | | | |
| 300% deformation stress (MPa) | 4.5 | 4.7 | 4.9 |
| Breaking strength (MPa) | 17.2 | 17.8 | 18.1 |
| Elongation at break (%) | 761 | 782 | 781 |
| tanδ (0° C.) | 0.31 | 0.33 | 0.33 |
| tanδ (60° C.) | 0.26 | 0.26 | 0.26 |
| tanδ gradient (0°/60° C.) | 1.19 | 1.27 | 1.27 |
| Wear resistance (index) | 100 | 105 | 107 |

(Note: [*1]indicates Comparative Example and [*2]Example of Invention)

Examples II-7 and II-8 (Comparative Examples) and Examples II-9 and II-10 (Examples of Invention)

These Examples show the results of evaluation of a polysiloxane/wax mixture in an SBR system.

TABLE VI

|  | Ex. II-7[*1] | Ex. II-8[*1] | Ex. II-9[*2] | Ex.II-10[*2] |
|---|---|---|---|---|
| (Step 1) | | | | |
| SBR (NP9528) | 100.0 | 100.0 | 100.0 | 100.0 |
| SBR (NP1730) | 40.0 | 40.0 | 40.0 | 40.0 |
| Silica | 20.0 | 20.0 | 20.0 | 20.0 |
| Diethylene glycol | 1.5 | 1.5 | 1.5 | 1.5 |
| Silane coupling agent | 1.0 | 1.0 | 1.0 | 1.0 |
| Polysiloxane | 1.0 | — | — | — |
| Wax 1/polysiloxane (=1/1) mixture | — | — | 2.0 | — |
| Wax 2/polysiloxane (=1/1) mixture | — | — | — | 2.0 |
| Carbon black 1/polysiloxane (=1/1) mixture | — | 2.0 | — | — |
| Wax 1 | 1.0 | 1.0 | — | — |
| Wax 2 | — | — | — | — |
| Carbon black 1 | 1.0 | — | 1.0 | 1.0 |
| Carbon black 2 | 70.0 | 70.0 | 70.0 | 70.0 |
| Zinc oxide | 3.0 | 3.0 | 3.0 | 3.0 |
| Stearic acid | 2.0 | 2.0 | 2.0 | 2.0 |
| Antioxidant 6C | 5.0 | 5.0 | 5.0 | 5.0 |
| Aroma oil | 10.0 | 10.0 | 10.0 | 10.0 |
| (Step 2) | | | | |
| Powder sulfur | 2.0 | 2.0 | 2.0 | 2.0 |
| Vulcanization accelerator CZ | 2.0 | 2.0 | 2.0 | 2.0 |

TABLE VI-continued

|  | Ex. II-7[*1] | Ex. II-8[*1] | Ex. II-9[*2] | Ex.II-10[*2] |
|---|---|---|---|---|
| -Vulcanized physical properties- | | | | |
| 300% deformation stress (MPa) | 10.4 | 10.7 | 11.2 | 11.0 |
| Breaking strength (MPa) | 21.7 | 22.2 | 22.5 | 22.6 |
| Elongation at break (%) | 673 | 686 | 689 | 690 |
| tanδ (0° C.) | 0.74 | 0.74 | 0.74 | 0.75 |
| tanδ (60° C.) | 0.36 | 0.34 | 0.34 | 0.34 |
| tanδ gradient (0°/60° C.) | 2.03 | 2.15 | 2.15 | 2.15 |
| Wear resistance (index) | 100 | 105 | 109 | 108 |

(Note: [*1]indicates Comparative Example and [*2]Example of Invention)

As shown in the above Examples, according to the present invention, as shown in Table IV to Table VI, compared with Examples II-1 and II-2, Examples II-4 and II-5, and Examples II-7 and II-8, as shown in Examples II-3 and II-6 and II-9 to II-10, blending of a polysiloxane containing the alkoxysilyl groups (III) or (IV) and a wax enables mixing without overreaction with the silanol groups on the silica surface in the mixing of step 1 and improvement of the physical properties (tensile strength, wear resistance, and tan δ). Note, in the present invention, the superiority of the tan δ balance is shown by the large gradient of the tan δ between 0° C. and 60° C.

Example III

The components used in the following Standard Examples, Examples of the invention, and Comparative Examples were as follows:

Natural rubber: RSS#1

SBR: Nipol NS116 (made by Nippon Zeon)

Polysiloxane 1:

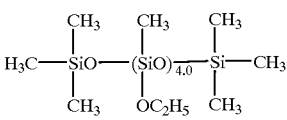

Silane coupling agent: Si 69 (Degussa) (chemical name: bis-[3-(triethoxysilyl)-propyl]tetrasulfide)

Catalyst 1: Tetraisopropyl titanate

Catalyst 2: Titanium acetyl acetate (Orgatix TC-100, Matsumoto Kosho)

Catalyst 3: Dibutyltin dilaurate

Catalyst 4: Dimethylstearyl amine

Polysiloxane: Polymethylethoxysiloxane

Carbon black 1: Seast KH (Tokai Carbon)

Silica: Nipsil AQ (Nippon Silica)

Zinc oxide: Zinc White No. 3

Stearic acid: Industrial use stearic acid

Antioxidant 6C: N-phenyl-N'-(1,3-dimethylbutyl)-p-phenylene diamine

Powder sulfur: 5 percent oil-treated powder sulfur

Vulcanization accelerator: N-cyclohexyl-2-benzothiazylsulfenamide

Examples III-1

The unvulcanized physical properties (Mooney viscosity, vulcanization rate, and scorch time) and the vulcanized physical properties (300% deformation stress, breakage strength, and elongation at break) were measured and evaluated for (A) examples of joint use of a silane coupling agent and silanol condensation catalyst (Examples III-1 to III-4), (B) Examples of joint use of a silanol condensation catalyst in a mixture of the silane coupling agent and polysiloxane (Examples III-5 to III-8), and example of joint use of the polysiloxane 1 and a silanol condensation catalyst (Example III-9).

Preparation of Samples

The ingredients other than the vulcanization accelerator and sulfur were kneaded in a 1.8 liter Xinternal mixer for 3 to 5 minutes. When reaching 165±5° C., the master batch was discharged. The vulcanization accelerator and sulfur were kneaded by an 8-inch open roll to obtain the rubber composition. The unvulcanized physical properties of the obtained rubber composition were measured.

Next, the composition was press-vulcanized in a 15×15× 0.2 cm mold at 160° C. for 20 minutes to prepare the target test piece (rubber sheet) which was then evaluated for its vulcanized physical properties.

The test methods for the unvulcanized physical properties and vulcanized physical properties of the compositions obtained in the examples were as follows:

Unvulcanized Physical Properties

1) Mooney viscosity: Measured at 100° C. based on JIS K6300
2) Vulcanization rate: The time for reaching 95% vulcanization at 160° C. was measured based on JIS K6300.
3) Scorch time: The time for the viscosity to rise 5 points at 125° C. was measured based on JIS K6300.

Vulcanized Physical Properties 1) 300 percent deformation stress, breaking strength, elongation at break: Measured based on JIS K6251 (dumbbell shape No. 3)

The results are shown in Table VII.

TABLE VII

| | Stand. Ex. III-1 | Ex. III-1 | Ex. III-2 | Ex. III-3 | Ex. III-4 |
|---|---|---|---|---|---|
| Formulation (parts by weight) | | | | | |
| Natural rubber | 50 | 50 | 50 | 50 | 50 |
| SBR | 50 | 50 | 50 | 50 | 50 |
| Polysiloxane 1 | — | — | — | — | — |
| Silane coupling agent | 2.5 | 2.5 | 2.5 | 2.5 | 2.5 |
| Catalyst 1 | — | 1 | — | — | — |
| Catalyst 2 | — | — | 1 | — | — |
| Catalyst 3 | — | — | — | 1 | — |
| Catalyst 4 | — | — | — | — | 1 |
| Carbon black 1 | 25 | 25 | 25 | 25 | 25 |
| Silica | 25 | 25 | 25 | 25 | 25 |
| Diethylene glycol | 2.5 | 2.5 | 2.5 | 2.5 | 2.5 |
| Zinc oxide | 3 | 3 | 3 | 3 | 3 |
| Stearic acid | 1 | 1 | 1 | 1 | 1 |
| Antioxidant 6C | 1 | 1 | 1 | 1 | 1 |
| Powder sulfur | 2.1 | 2.1 | 2.1 | 2.1 | 2.1 |
| Vulcanization accelerator | 2.5 | 2.5 | 2.5 | 2.5 | 2.5 |
| Unvulcanized physical properties | | | | | |
| Mooney viscosity | 86 | 88 | 85 | 85 | 79 |
| Vulcanization rate | 13.7 | 11.3 | 13.1 | 10.7 | 13.4 |
| Scorch time | 16.5 | 17.2 | 16.9 | 17 | 16.8 |
| Vulcanized physical properties | | | | | |
| 300% deformation stress (MPa) | 12.3 | 12.7 | 11.6 | 14.5 | 11.9 |
| Breakage strength (MPa) | 22 | 24.2 | 24.7 | 24.2 | 23.7 |
| Elongation at break (%) | 506 | 523 | 513 | 523 | 509 |

| | Stand. Ex. III-2 | Ex. III-5 | Ex. III-6 | Ex. III-7 | Ex. III-8 | Comp. Ex. III-3 | Ex. III-9 |
|---|---|---|---|---|---|---|---|
| Formulation (parts by weight) | | | | | | | |
| Natural rubber | 50 | 50 | 50 | 50 | 50 | 50 | 50 |
| SBR | 50 | 50 | 50 | 50 | 50 | 50 | 50 |
| Polysiloxane 1 | 1.25 | 1.25 | 1.25 | 1.25 | 1.25 | 2.5 | 2.5 |
| Silane coupling agent | 1.25 | 1.25 | 1.25 | 1.25 | 1.25 | — | — |
| Catalyst 1 | — | 1 | — | — | — | — | — |
| Catalyst 2 | — | — | 1 | — | — | — | 5 |
| Catalyst 3 | — | — | — | 1 | — | — | — |
| Catalyst 4 | — | — | — | — | 1 | — | — |
| Carbon black 1 | 25 | 25 | 25 | 25 | 25 | 25 | 25 |
| Silica | 25 | 25 | 25 | 25 | 25 | 25 | 25 |
| Diethylene glycol | 2.5 | 2.5 | 2.5 | 2.5 | 2.5 | 2.5 | 2.5 |
| Zinc oxide | 3 | 3 | 3 | 3 | 3 | 3 | 3 |
| Stearic acid | 1 | 1 | 1 | 1 | 1 | 1 | 1 |
| Antioxidant 6C | 1 | 1 | 1 | 1 | 1 | 1 | 1 |
| Powder sulfur | 2.1 | 2.1 | 2.1 | 2.1 | 2.1 | 2.1 | 2.1 |
| Vulcanization accelerator | 2.5 | 2.5 | 2.5 | 2.5 | 2.5 | 2.5 | 2.5 |
| Unvulcanized physical properties | | | | | | | |
| Mooney viscosity | 84 | 80 | 81 | 84 | 79 | 89 | 80 |
| Vulcanization rate | 11.4 | 9.9 | 10.2 | 9.4 | 11 | 10.2 | 9.5 |
| Scorch time | 17.5 | 18.6 | 20.3 | 19.3 | 18 | 18.5 | 18.79 |
| Vulcanized physical properties | | | | | | | |
| 300% deformation stress (MPa) | 11.2 | 11 | 11.2 | 10.2 | 11.8 | 9.7 | 9.6 |
| Breakage strength (MPa) | 23.3 | 24.5 | 25 | 23.7 | 23.6 | 19.8 | 19.7 |
| Elongation at break (%) | 547 | 497 | 537 | 490 | 470 | 520 | 524 |

As is clear from the results shown in Table VII, in the system (A) where the silane coupling agent and the catalyst according to the present invention were blended in the silica formulation rubber composition, the system (B) where a silane coupling agent, the polysiloxane 1, and the catalyst according to the present invention were formulated, and the system (C) where the polysiloxane 1 and the catalyst according to the present invention were formulated, improved results were shown for all of the unvulcanized physical properties and vulcanized physical properties compared with the Standard Examples III-1, III-2, and III-3.

Example IV

In these Examples, the difference in the reactivity by the A) system of silica and a silane coupling agent, B) system of silica and the polysiloxane 1, and C) system of silica, a silane coupling agent, and the polysiloxane 1 when changing the type and amount of blending of the condensation catalyst according to the present invention was examined by measuring the reactivity in each of these cases.

Note that the reactivity here is calculated by adding 1 g of a silane coupling agent and/or polysiloxane to 5 g of silica, adding to this the predetermined amount of the condensation catalyst of the example, causing a reaction at 120° C. for 1 hour, then finding the amount of the unreacted silane coupling agent or polysiloxane by Soxhlet extraction using 100 g of acetone.

The results are shown in the following Table VIII.

TABLE VIII

|  | Comp. Ex. IV-1 | Ex. IV-1 | Ex. IV-2 | Ex. IV-3 | Ex. IV-4 | Ex. IV-5 | Comp. Ex. IV-2 | Ex. IV-6 | Ex. IV-7 | Ex. IV-8 |
|---|---|---|---|---|---|---|---|---|---|---|
| Silica | 5 | 5 | 5 | 5 | 5 | 5 | 5 | 5 | 5 | 5 |
| Silane coupling agent (Si 69) | 1 | 1 | 1 | 1 | 1 | 1 | — | — | 0.5 | 0.5 |
| Polysiloxane 1 | — | — | — | — | — | — | 1 | 1 | 0.5 | 0.5 |
| Tetraisopropyl titanate | — | 0.05 | — | — | — | 0.02 | — | 0.05 | 0.01 | 0.025 |
| Titanium acetyl acetate | — | — | 0.05 | — | — | — | — | — | — | — |
| Dibutyltin dilaurate | — | — | — | 0.02 | — | — | — | — | — | — |
| Dimethylstearylamine | — | — | — | — | 0.1 | — | — | — | — | — |
| Reactivity (%) | 38 | 87 | 76 | 62 | 57 | 73 | 65 | 99 | 91 | 99 |

It is understood from the results of Table VIII. That comparison of the results of Comparative Example IV-1 and Examples IV-1 to IV-4 shows that the reactivity in a system of silica and a silane coupling agent is remarkably improved no matter which catalyst according to the present invention is blended. Further, it was learned that there are differences in the degree of improvement due to the type of the catalyst and that a titanium family catalyst is superior to the others. Further, a comparison of Example IV-1 and Example IV-5 shows that even if the same type of catalyst is used, the reactivity rises by increasing the amount of the catalyst. Further, a comparison of the results of Comparative Example IV-2 and Example IV-6 shows that the reactivity in a system of silica and the polysiloxane 1 is greatly improved by the blending of the titanium family catalyst according to the present invention. Further, a comparison of Example IV-6, IV-7, and IV-8 shows that differences in combination of the silane coupling agent and polysiloxane 1 accompanying the reaction with the silica and amounts of the catalyst blended can improve the reactivity and further change the extent of the reaction.

As explained above, according to the third aspect of the present invention, by adding to a silica formulation rubber composition a silane coupling agent and/or alkoxysilyl group containing polysiloxane and silanol condensation catalyst, it is possible to remarkably accelerate the reaction between the silica and the silane coupling agent and/or alkoxysilyl group containing polysiloxane and, as a result, possible to impart higher physical properties and performance to the rubber composition even with the same amount of addition of the silane coupling agent and/or alkoxysilyl group containing polysiloxane and to reduce the amount of use of the expensive silane coupling agent.

We claim:

1. A polysiloxane composition comprising (A) a polysiloxane having a group represented by the formula

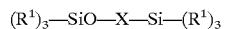

wherein:

$R^1$ is —$CH_3$ or —$C_6H_5$; and

X is selected from the group consisting of the following formulas (A), (B) and (C):

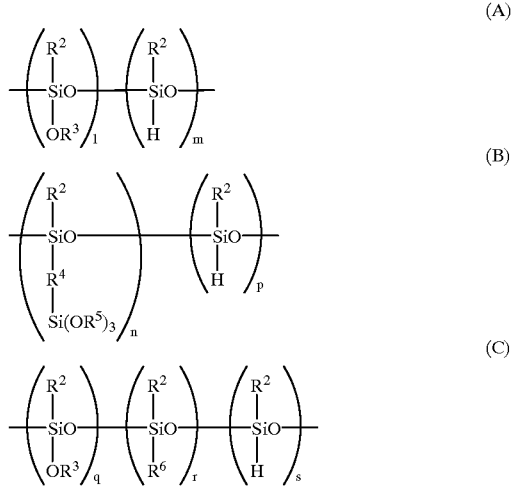

wherein:

$R^2$ is a methyl group;

$R^3$ is —$CH_3$, —$C_2H_5$, —$C_3H_7$, —$C_4H_9$, —$C_5H_{11}$, —$C_7H_{15}$, —$C_8H_{17}$, —$C_{18}H_{37}$, —$C_6H_5$, —$CH_2$—$C_6H_5$, —$OCH_2CH_2OCH_3$ or —$OCH_2CH_2OCH_2CH_2OCH_3$;

$R^4$ is

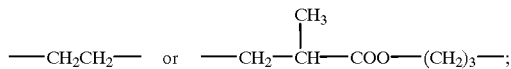

$R^5$ is —$CH_3$ or —$C_2H_4OCH_3$;

$R^6$ is a residue of α-methylstyrene dimer; and when X is (A), l and m are at least 1 and the total of l and m are from 2 to 1000: when X is (B), n and p are at least 1 and the total of n and p are from 2 to 1000: and when X is (C). q. r. and s are at least 1 and the total of q, r, and s are from 3 to 1000; and (B) at least 1 ppm of a sulfur-containing compound.

2. A polysiloxane composition as claimed in claim 1, wherein said sulfur-containing compound is a compound having a thiol group, a sulfide group, a thiazole group or a thiocarbamoyl group.

3. A polysiloxane composition as claimed in claim 1, wherein said sulfur-containing compound is a sulfur-containing silane coupling agent selected from the group consisting of bis-(3-triethoxysilylpropyl)-tetrasulfide, 3-trimethoxysilylpropyl-N,N-dimethylthiocarbomoyl-tetrasulfide, trimethoxysilylpropyl-mercaptobenzothiazole tetrasulfide, triethoxysilylpropyl-methacrylate-monosulfide, dimethoxymethylsilylpropyl-N,N-dimethylthiocarbamoyl-tetrasulfide, and γ-mercaptopropyltrimethoxysilane.

4. A surface treating agent for a rubber reinforcing silica comprising the polysiloxane composition of claim 1.

5. A processing adjuvant for a silica formulation rubber composition comprising the polysiloxane composition of claim 1.

\* \* \* \* \*